United States Patent
Hong

(10) Patent No.: US 11,871,381 B2
(45) Date of Patent: Jan. 9, 2024

(54) DATA TRANSMISSION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 479 days.

(21) Appl. No.: 17/293,907

(22) PCT Filed: Nov. 16, 2018

(86) PCT No.: PCT/CN2018/115842
§ 371 (c)(1),
(2) Date: May 13, 2021

(87) PCT Pub. No.: WO2020/097904
PCT Pub. Date: May 22, 2020

(65) Prior Publication Data
US 2022/0022171 A1 Jan. 20, 2022

(51) Int. Cl.
*H04W 72/04* (2023.01)
*H04W 74/08* (2009.01)

(52) U.S. Cl.
CPC ....... *H04W 72/04* (2013.01); *H04W 74/0833* (2013.01)

(58) Field of Classification Search
CPC .......................... H04W 72/04; H04W 74/0833
See application file for complete search history.

(56) References Cited

U.S. PATENT DOCUMENTS

2003/0063324 A1* 4/2003 Takaoka ............ H04N 1/33307
358/404

FOREIGN PATENT DOCUMENTS

CN 101567749 A 10/2009

OTHER PUBLICATIONS

PCT/CN2018/15842 English translation of International Search Report dated Aug. 15, 2019, 2 pages.

* cited by examiner

*Primary Examiner* — Justin Y Lee
(74) *Attorney, Agent, or Firm* — COZEN O'CONNOR

(57) ABSTRACT

A data transmission method and apparatus. The method includes: receiving physical configuration information of a terminal sent by the terminal, in which the physical configuration information includes a memory size and/or a read-write speed of the memory; determining target radio resource configuration parameters matching the physical configuration information; and transmitting data to the terminal using the target radio resource configuration parameters.

11 Claims, 5 Drawing Sheets

DATA TRANSMISSION METHOD AND APPARATUS

This application is the US national phase application of International Application No. PCT/CN2018/115842, filed on Nov. 16, 2018, the entire contents of which are incorporated herein by reference.

TECHNICAL FIELD

The present disclosure relates to the field of communication technology, and more particularly, to a data transmission method and apparatus.

BACKGROUND

With the rapid development of mobile communication technology, 5G (fifth generation) New NR (New Radio) UE (User Equipment) may be configured by high order MIMO (multiple input multiple output), multicarrier aggregation, high order modulation coding, or large bandwidth and other ways to obtain ultra-high transmission rate, to meet the user's demand for high-rate data transmission.

In the related art, the cache configuration and read-write speed of some 5G terminals do not support the high rate of 5G As a result, the 5G terminal may encounter a buffer overflow problem due to mismatching between the cache configuration and the read-write speed of the 5G terminal and the high rate of 5G, which may lead to frequent data retransmission, waste of system resources, thereby affecting the quality of the service.

SUMMARY

According to a first aspect of embodiments of the present disclosure, a data transmission method is provided. The method is applied to a network access device and includes:
  receiving physical configuration information of a terminal sent by the terminal, the physical configuration information including a size and/or a read-write speed of a memory;
  determining target radio resource configuration parameters matching the physical configuration information; and
  transmitting data to the terminal using the target radio resource configuration parameters.

According to a second aspect of embodiments of the present disclosure, a data transmission method is provided. The method is applied to a terminal, and includes:
  obtaining physical configuration information of the terminal, the physical configuration information including a size and/or a read-write speed of a memory;
  sending the physical configuration information of the terminal to a network access device when the terminal performs an initial connection with the network access device, the physical configuration information being configured to enable the network access device to determine target radio resource configuration parameters matching the physical configuration information.

According to a third aspect of embodiments of the present disclosure, a data transmission device is provided. The device includes
  a processor; and
  a memory configured to store instructions executable by the processor,
  wherein, the processor is configured to:
  receive physical configuration information of a terminal sent by the terminal, the physical configuration information comprising a size and/or a read-write speed of a memory;
  determine target radio resource configuration parameters matching the physical configuration information; and
  transmit data to the terminal using the target radio resource configuration parameters.

According to a fourth aspect of embodiments of the present disclosure, a data transmission device is provided. The device includes:
  a processor; and
  a memory configured to store instructions executable by the processor,
  wherein, the processor is configured to:
  obtain physical configuration information of the terminal, the physical configuration information comprising a size and/or a read-write speed of a memory;
  send the physical configuration information of the terminal to a network access device when the terminal performs an initial connection with the network access device, the physical configuration information being configured to enable the network access device to determine target radio resource configuration parameters matching the physical configuration information.

According to a fifth aspect of embodiments of the present disclosure, a computer readable storage medium is provided. The storage medium has stored therein computer instructions that, when executed by a processor, steps of the method described the first aspect are implemented.

According to a sixth aspect of embodiments of the present disclosure, a computer readable storage medium is provided. The storage medium has computer instructions stored thereon that, when executed by a processor, steps of the method described according to the second aspect are implemented.

It should be understood that the above general description and the following detailed description are by way of examples and for explanatory purposes only and do not limit the invention.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The exemplary embodiments will be described in detail herein and shown in the accompanying drawings. When the following description refers to the drawings, unless otherwise indicated, the same reference number in different drawings indicates a same or similar element. The implementation described in the following exemplary embodiments do not represent all implementation consistent with the present disclosure. Rather, they are merely examples of devices and methods consistent with some aspects of the present disclosure as detailed in the appended claims.

Embodiments of the present disclosure provides a data transmission method applied to a network access device. The method includes: receiving physical configuration information of a terminal sent by the terminal, the physical configuration information comprising a size and/or a read-write speed of a memory; determining target radio resource configuration parameters matching the physical configuration information; and transmitting data to the terminal using the target radio resource configuration parameters. In the data transmission method provided by embodiments of the present disclosure, by obtaining the physical configuration information of the terminal, and configuring matched target radio resource configuration parameters for the terminal according to the physical configuration information of the terminal, it is possible to avoid a buffer overflow problem of the terminal due to mismatching between the physical configuration information of the terminal and the configurated high rate, reducing a number of data retransmissions, saving system resource, and improving business quality. It should be noted that, the data transmission method provided by embodiments of the present disclosure be applied to 3G/4G communication network, or 5G NR communication network and other communication networks supporting high rate data transmission. The terminal involved in the present disclosure, for example, may include an electronic device such as a smart phone, a laptop, or a smart wearable device. The network access device involved in the present disclosure may include, for example, a base station, or a relay station and other communication device providing wireless access services for the terminal.

Based on the above analysis, following specific embodiments are provided.

Figure 1:
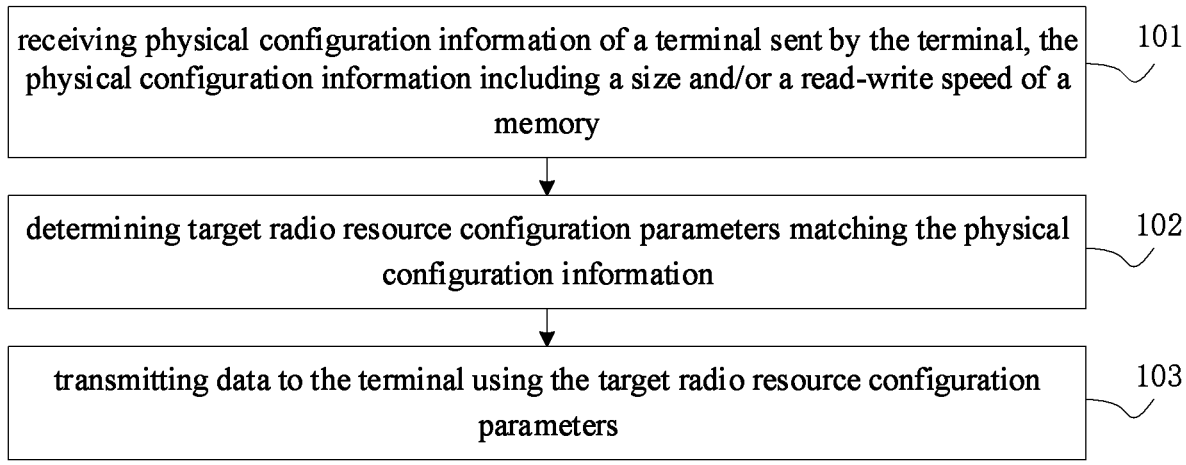
FIG. 1 is a flow chart of a data transmission method according to an exemplary embodiment.

FIG. 1 is a flow chart of a data transmission method according to an exemplary embodiment. The execution body of the data transmission method may be a network access device. As illustrated in FIG. 1, the method includes following steps 101-103.

At step 101, physical configuration information of a terminal sent by the terminal is received, the physical configuration information including a size and/or a read-write speed of a memory.

For example, the terminal obtains the physical configuration information of the terminal, and sends the physical configuration information of the terminal to the network access device when performing an initial connection with the network access device. The network access device receives the physical configuration information of the terminal sent by the terminal when performing the initial connection with the network access device.

For example, the network access device may receive the physical configuration information of the terminal sent by the terminal through any or a combination of following implementations.

Implementation 1: when the terminal performs random access procedure, the terminal sends the physical configuration information of the terminal to the network access device, and the network access device receives the physical configuration information of the terminal sent by the terminal when performing the random access procedure. For example, the physical configuration information of the terminal may be actively reported by the terminal to the network access device during the random access procedure, for example, the physical configuration information of the terminal is carried in the message 3 (Msg3) sent by the terminal to the network access device.

Implementation 2: when the terminal receives a terminal capability enquiry message sent by the network access device, the terminal sends terminal capability information to the terminal, the terminal capability information including the physical configuration information of the terminal, and the network access device receives the terminal capability information sent by the terminal after sending the terminal capability enquiry message to the terminal. For example, the physical configuration information of the terminal may be reported in the terminal capability information (UE Capability Information) signaling sent by the terminal to the network access device after the terminal receiving the terminal capability enquiry (UE Capability Enquiry) signaling sent by the network access device.

At step 102, target radio resource configuration parameters matching the physical configuration information are determined.

For example, a maximum data transmission rate of the terminal is determined according to the physical configuration information, a target data transmission rate of the terminal is determined according to the maximum data transmission rate and a contracted rate of the terminal, and the target radio resource configuration parameters of the terminal are determined according to the target data transmission rate of the terminal. For example, first, according to the size and/or read-write speed of the memory of the terminal, under the premise of not occurring buffer overflow, the maximum data transmission rate of the terminal is determined. For example, when the read-write speed of the memory of the terminal 1 is 1 Gbps, the maximum data transmission rate supported by the terminal under the premise of not occurring the buffer overflow can reach 1 Gbps. Secondly, the maximum data transmission rate of the terminal is compared with the contracted rate of the terminal. When the maximum data transmission rate of the terminal is less than the contracted rate of the terminal, the maximum data transmission rate of the terminal is determined as the target data transmission rate of the terminal. When the maximum data transmission rate of the terminal is greater than or equal to the contracted rate of the terminal, the contracted rate of the terminal is determined as the target data transmission rate of the terminal. Then, the target radio resource configuration parameters of the terminal are determined according to the target data transmission rate, the wireless measurement results, the size of the data to be transmitted and the available radio resources. Optionally, the target radio resource configuration parameters may include, for example, carrier count, bandwidth, and antenna configuration.

At step 103, data is transmitted to the terminal using the target radio resource configuration parameters.

With the technical solution provided by embodiments of the present disclosure, by obtaining the physical configuration information of the terminal, and configuring matched target radio resource configuration parameters for the terminal according to the physical configuration information of the terminal, it is possible to avoid a buffer overflow problem of the terminal due to mismatching between the physical configuration information of the terminal and the configurated high rate, reducing a number of data retransmissions, saving system resource, and improving business quality.

Figure 2:
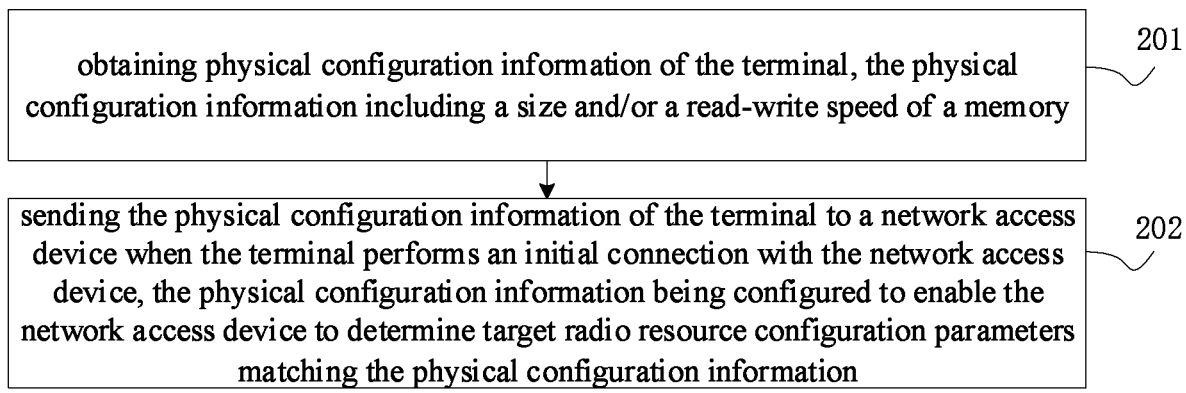
FIG. 2 is a flow chart of a data transmission method according to an exemplary embodiment.

FIG. 2 is a flow chart of a data transmission method according to an exemplary embodiment. The execution body of the data transmission method may be a terminal. As illustrated in FIG. 2, the method includes following steps 201-202.

At step 201, physical configuration information of the terminal is obtained, the physical configuration information including a size and/or a read-write speed of a memory.

At step 202, when the terminal performs an initial connection with a network access device, the physical configuration information of the terminal is sent to the network access device, the physical configuration information being configured to enable the network access device to determine target radio resource configuration parameters matching the physical configuration information.

For example, when the terminal performs the initial connection with the network access device, the terminal may send the physical configuration information of the terminal to the network access device through any or a combination of following implementations.

Implementation a: when the terminal performs random access procedure, the terminal sends the physical configuration information of the terminal to the network access device, and the network access device receives the physical configuration information of the terminal sent by the terminal when performing the random access procedure. For example, the physical configuration information of the terminal may be actively reported by the terminal to the network access device during the random access procedure, for example, the physical configuration information of the terminal is carried in the message 3 (Msg3) sent by the terminal to the network access device.

Implementation b: when the terminal receives a terminal capability enquiry message sent by the network access device, the terminal sends terminal capability information to the terminal, the terminal capability information including the physical configuration information of the terminal, and the network access device receives the terminal capability information sent by the terminal after sending the terminal capability enquiry message to the terminal.

With the technical solution provided by embodiments of the present disclosure, the terminal sends the physical configuration information of the terminal to the network access device when performing the initial connection with the network access device, such that the network device configures matched target radio resource configuration parameters for the terminal according to the physical configuration information of the terminal. Therefore, it is possible to avoid a buffer overflow problem of the terminal due to mismatching between the physical configuration information of the terminal and the configurated high rate, reducing a number of data retransmissions, saving system resource, and improving business quality.

Figure 3:
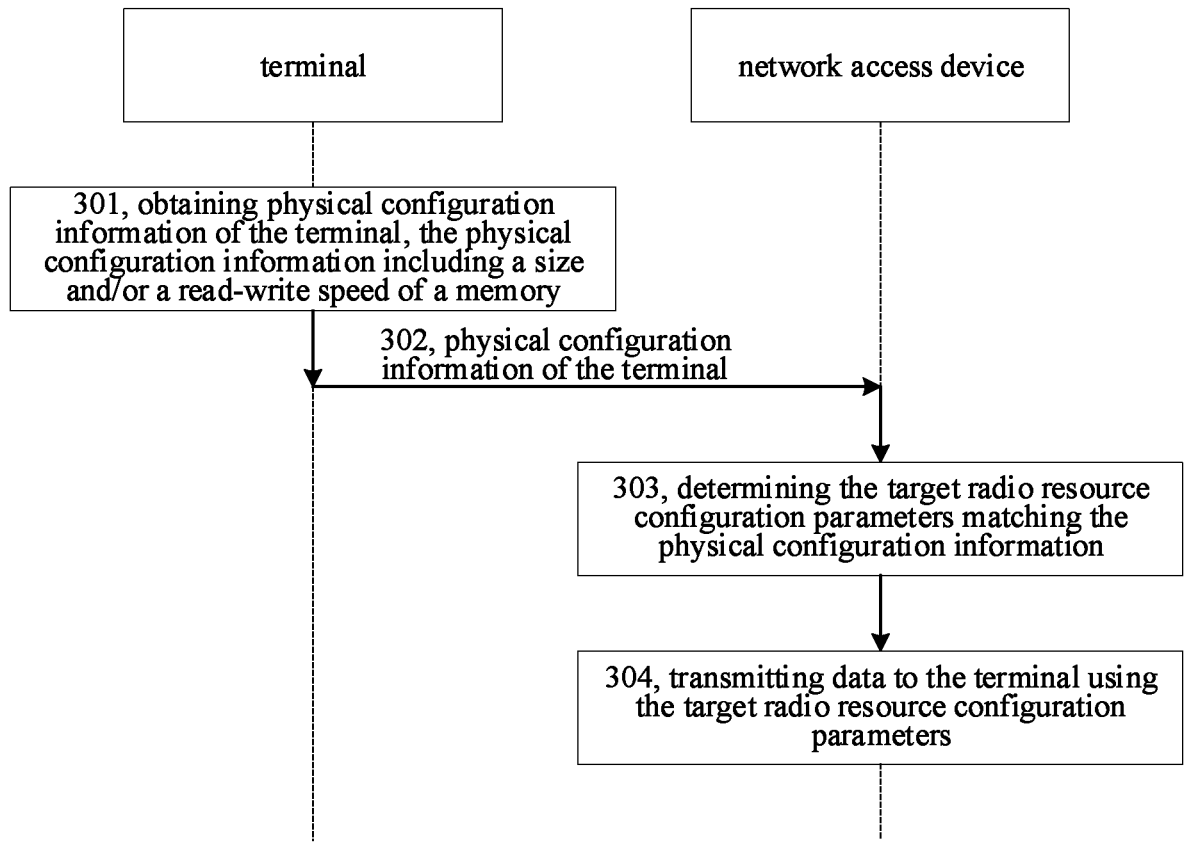
FIG. 3 is a flow chart of a data transmission method according to an exemplary embodiment.

FIG. 3 is a flow chart of a data transmission method according to an exemplary embodiment. The method is implemented by a terminal in cooperation with a network access device in 5G NR communication network. As illustrated in FIG. 3, on the basis of embodiments illustrated in FIG. 1 and FIG. 2, the data transmission method involved in the present disclosure may include following steps 301-304.

At step 301, the terminal obtains physical configuration information of the terminal, the physical configuration information including a size and/or a read-write speed of a memory.

At step 302, the terminal sends the physical configuration information of the terminal to the network access device when performing the initial connection with the network access device, the physical configuration information being configured to enable the network access device to determine target radio resource configuration parameters matching the physical configuration information.

At step 303, the network access device receives the physical configuration information of the terminal sent by the terminal, and determines the target radio resource configuration parameters matching the physical configuration information.

At step 304, the network access device transmits data to the terminal using the target radio resource configuration parameters.

In this embodiment, the terminal reports the physical configuration information, for example, the size and/or read-write speed of the memory of the terminal, when performing the initial connection with the network access device, and the network access device configures the matched target radio resource configuration parameters for the terminal according to the physical configuration information after receiving the physical configuration information sent by the terminal. Therefore, the terminal may not have the buffer overflow problem due to mismatching between the buffer configuration of the terminal itself and the configurated high rate, thus improving the business quality of the terminal.

Following are apparatus embodiments of the present disclosure, which may be configured to implement method embodiments of the present disclosure.

Figure 4:
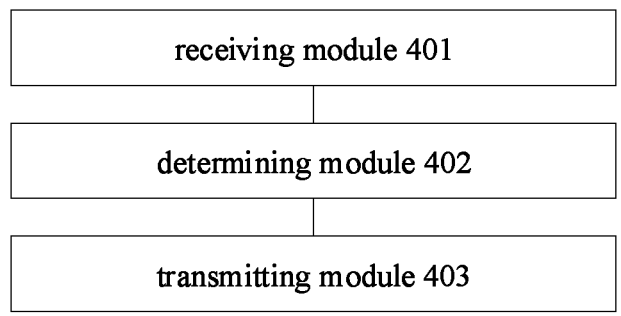
FIG. 4 is a block diagram of a data transmission apparatus according to an exemplary embodiment.

FIG. 4 is a block diagram of a data transmission apparatus according to an exemplary embodiment. The apparatus may be applied to a network access device. Referring to FIG. 4, the data transmission apparatus includes a receiving module 401, a determining module 402 and a transmitting module 403.

The receiving module 401 is configured to receive physical configuration information of a terminal sent by the terminal, the physical configuration information including a size and/or a read-write speed of a memory.

The determining module 402 is configured to determine target radio resource configuration parameters matching the physical configuration information.

The transmitting module 403 is configured to transmit data to the terminal using the target radio resource configuration parameters.

With the apparatus provided by embodiments of the present disclosure, the receiving module 401 receives the physical configuration information of the terminal sent by the terminal, the physical configuration information including the size and/or the read-write speed of the memory, the determining module 402 determines the target radio resource configuration parameters matching the physical configuration information, and the transmitting module 403 transmits data to the terminal using the target radio resource configuration parameters. Therefore, it is possible to avoid a buffer overflow problem of the terminal due to mismatching between the physical configuration information of the terminal and the configurated high rate, reducing a number of data retransmissions, saving system resource, and improving business quality.

In an embodiment, the receiving module 401 is configured to receive the physical configuration information of the terminal sent by the terminal when performing random access procedure.

In an embodiment, the receiving module 401 is configured to receive terminal capability information sent by the terminal after the network access device sending a terminal capability enquiry message to the terminal, the terminal capability information including the physical configuration information of the terminal.

Figure 5:
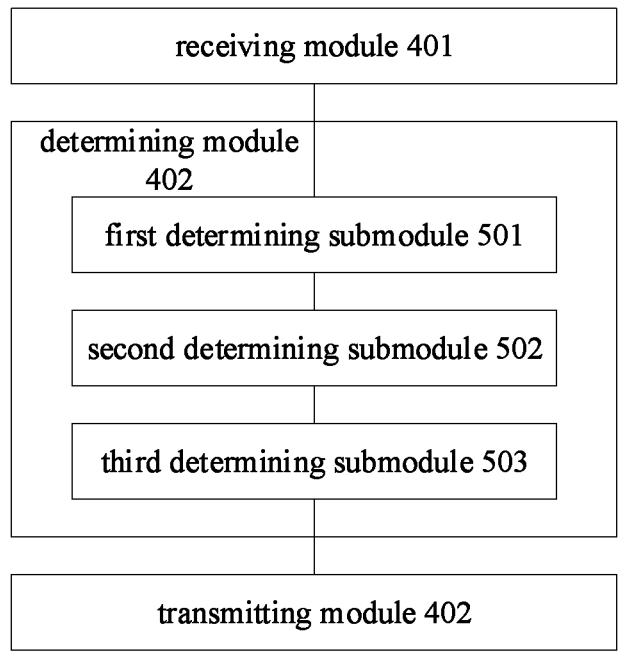
FIG. 5 is a block diagram of a data transmission apparatus according to an exemplary embodiment.

In an embodiment, as illustrated in FIG. 5, the data transmission apparatus illustrated in FIG. 4 may further include configuring the determining module 402 as including a first determining submodule 501, a second determining submodule 502 and a third determining submodule 503.

The first determining submodule 501 is configured to determine a maximum data transmission rate of the terminal according to the physical configuration information.

The second determining submodule 502 is configured to determine a target data transmission rate of the terminal according to the maximum data transmission rate and a contracted rate of the terminal.

The third determining submodule 503 is configured to determine the target radio resource configuration parameters of the terminal according to the target data transmission rate of the terminal.

Figure 6:
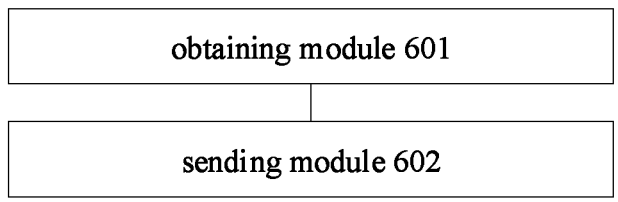
FIG. 6 is a block diagram of a data transmission apparatus according to an exemplary embodiment.

FIG. 6 is a block diagram of a data transmission apparatus according to an exemplary embodiment. The apparatus may be applied to a terminal. Referring to FIG. 6, the data transmission apparatus includes an obtaining module 601 and a sending module 602.

The obtaining module 601 is configured to obtain physical configuration information of the terminal, the physical configuration information including a size and/or a read-write speed of a memory;

The sending module 602 is configured to send the physical configuration information of the terminal to a network access device when the terminal performs an initial connection with the network access device, the physical configuration information being configured to enable the network access device to determine target radio resource configuration parameters matching the physical configuration information.

With the apparatus provided embodiments of the present disclosure, the obtaining module 601 obtains the physical configuration information of the terminal, the physical configuration information including the size and/or read-write speed of the memory, and the sending module 602 sends the physical configuration information of the terminal to the network access device when the terminal performs the initial connection with the network access device, the physical configuration information being configured to enable the network access device to determine the target radio resource configuration parameters matching the physical configuration information. Therefore, it is possible to avoid a buffer overflow problem of the terminal due to mismatching between the physical configuration information of the terminal and the configurated high rate, reducing a number of data retransmissions, saving system resource, and improving business quality.

In an embodiment, the sending module 602 is configured to send the physical configuration information of the terminal to the network access device when the terminal performs random access procedure.

In an embodiment, the sending module 602 is configured to send terminal capability information to the network access device when the terminal receives a terminal capability enquiry message sent by the network access device, the terminal capability information including the physical configuration information of the terminal.

Figure 7:
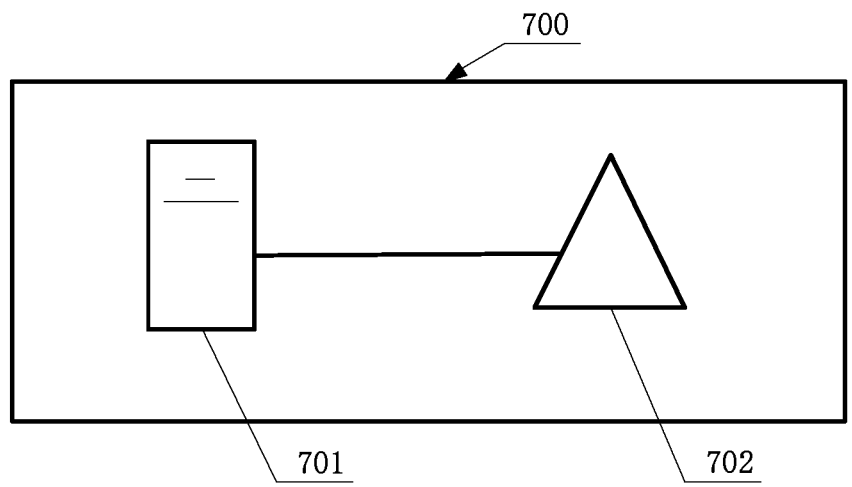
FIG. 7 is a schematic diagram of a data transmission device according to an exemplary embodiment.

FIG. 7 is a schematic diagram of a data transmission device 700 applied to a network access device according to an exemplary embodiment. The data transmission device 700 includes a processor 701 and a memory 702 configured to store instructions executable by the processor. The processor 701 is configured to:

receive physical configuration information of a terminal sent by the terminal, the physical configuration information including a size and/or a read-write speed of a memory;

determine target radio resource configuration parameters matching the physical configuration information; and transmit data to the terminal using the target radio resource configuration parameters.

In an embodiment, the processor 701 may be further configured to:

receive the physical configuration information of the terminal sent by the terminal when performing random access procedure.

In an embodiment, the processor 701 may be further configured to:

receive terminal capability information sent by the terminal after the network access device sending a terminal capability enquiry message to the terminal, the terminal capability information including the physical configuration information of the terminal.

In an embodiment, the processor 701 may be further configured to:

determine a maximum data transmission rate of the terminal according to the physical configuration information;

determine a target data transmission rate of the terminal according to the maximum data transmission rate and a contracted rate of the terminal; and determine the target radio resource configuration parameters of the terminal according to the target data transmission rate of the terminal.

Figure 8:
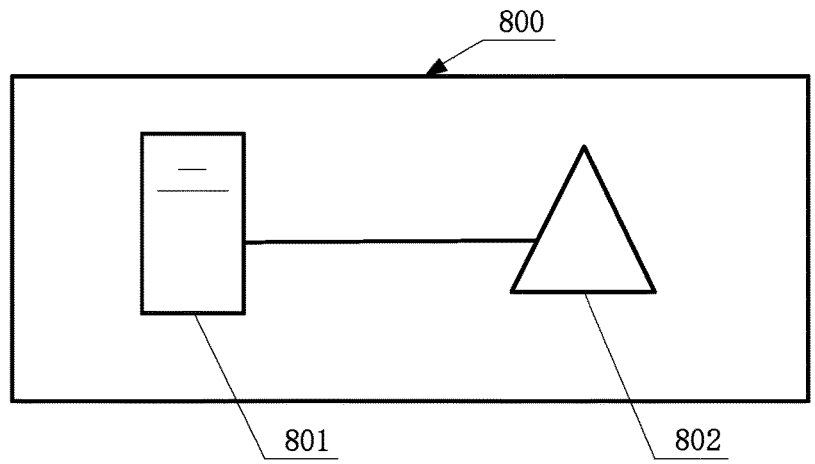
FIG. 8 is schematic diagram of a data transmission device according to an exemplary embodiment.

FIG. 8 is a schematic diagram of a data transmission device 800 applied to a terminal according to an exemplary embodiment. The data transmission device 800 includes a processor 801 and a memory 802 configured to store instructions executable by the processor. The processor 801 is configured to:

obtain physical configuration information of the terminal, the physical configuration information including a size and/or a read-write speed of a memory;

send the physical configuration information of the terminal to a network access device when the terminal performs an initial connection with the network access device, the physical configuration information being configured to enable the network access device to determine target radio resource configuration parameters matching the physical configuration information.

In an embodiment, the processor 801 may be further configured to:

send the physical configuration information of the terminal to the network access device when the terminal performs random access procedure.

In an embodiment, the processor 801 may be further configured to:

send terminal capability information to the network access device when the terminal receives a terminal capability enquiry message sent by the network access device, the terminal capability information including the physical configuration information of the terminal.

With respect to the devices in above embodiments, the specific manner in which each module performs the operation has been described in detail in the method embodiments and will not be elaborated here.

Figure 9:
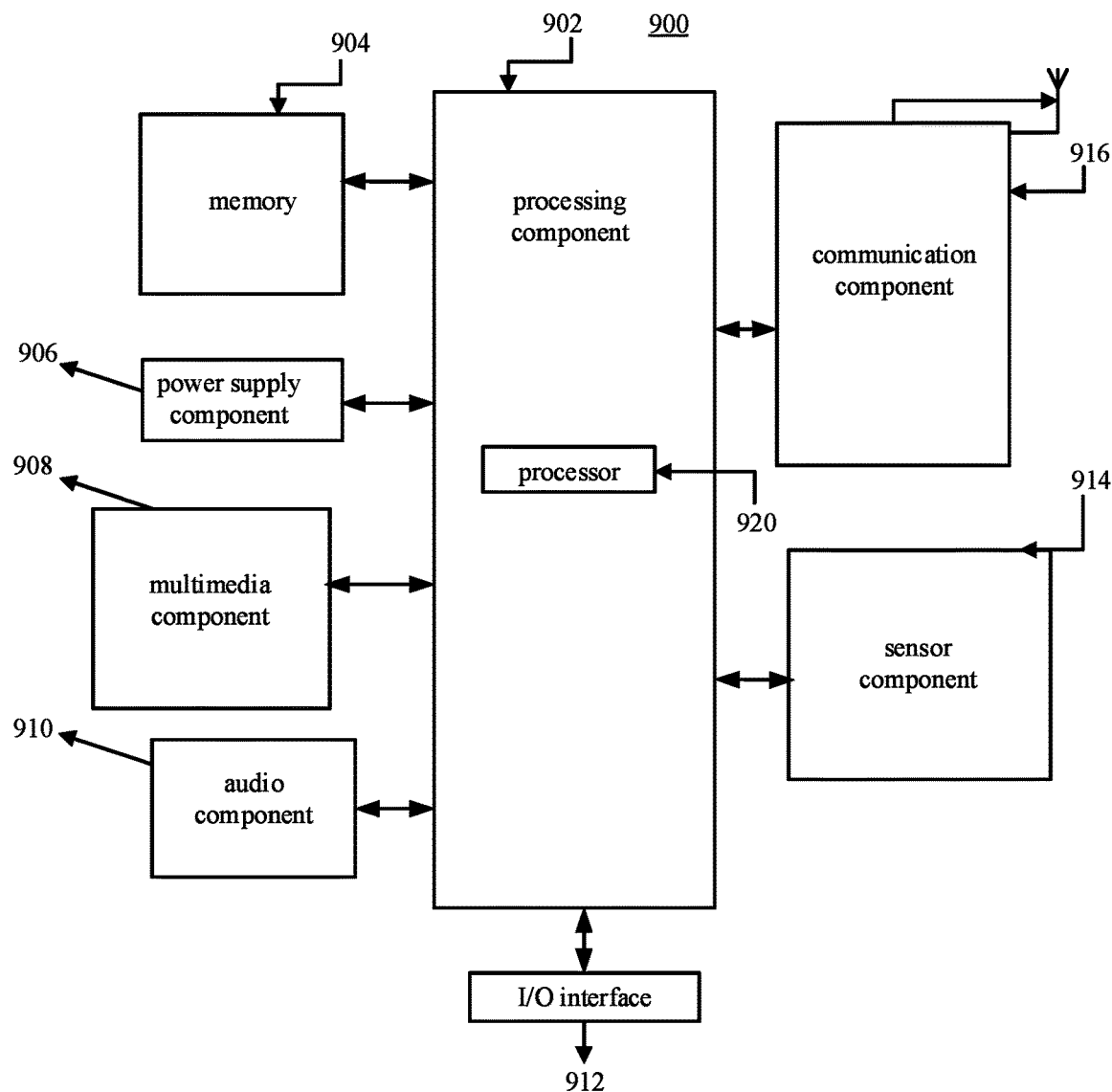
FIG. 9 is a block diagram of a data transmission device according to an exemplary embodiment.

FIG. 9 is a block diagram of a data transmission device according to an exemplary embodiment. The data transmission device 900 is suitable for a terminal. The data transmission device 900 may include one or more of the following components: a processing component 902, a memory 904, a power supply component 906, a multimedia component 908, an audio component 910, an input/output (I/O) interface 912, a sensor component 914, and a communication component 916.

The processing component 902 generally controls the overall operations of the data transmission device 900, such as operations associated with display, telephone calls, data communications, camera operations, and recording operations. The processing component 902 may include one or more processors 920 to execute instructions to implement all or part of the steps of the foregoing method. In addition, the processing component 902 may include one or more modules to facilitate the interaction between the processing component 902 and other components. For example, the processing component 902 may include a multimedia module to facilitate the interaction between the multimedia component 908 and the processing component 902.

The memory 904 is configured to store various types of data to support the operation of the data transmission device 900. Examples of such data include instructions for any application or method operating on the data transmission device 900, contact data, phone book data, messages, pictures, videos, etc. The memory 904 can be implemented by any type of volatile or non-volatile storage device or a combination thereof, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 906 provides power for various components of the data transmission device 900. The power supply component 906 may include a power management system, one or more power supplies, and other components for generating, managing, and distributing power for the data transmission device 900.

The multimedia component 908 includes a screen that provides an output interface between the data transmission device 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense a touch, a slide, and gestures on the touch panel. The touch sensor may not only sense the boundary of the touch or slide operation, but also detect the duration and pressure related to the touch or slide operation. In some embodiments, the multimedia component 908 includes a front camera and/or a rear camera. When the data transmission device 900 is in an operation mode, such as a shooting mode or a video mode, the front camera and/or the rear camera can receive external multimedia data. Each front camera and rear camera can be a fixed optical lens system or have focal length and optical zoom capabilities.

The audio component 910 is configured to output and/or input audio signals. For example, the audio component 910 includes a microphone (MIC). When the data transmission device 900 is in an operation mode, such as a call mode, a recording mode, and a voice recognition mode, the microphone is configured to receive external audio signals. The received audio signal may be further stored in the memory 904 or transmitted via the communication component 916. In some embodiments, the audio component 910 further includes a speaker for outputting audio signals.

The I/O interface 912 provides an interface between the processing component 902 and a peripheral interface module. The above-mentioned peripheral interface module may be a keyboard, a click wheel, a button, and the like. These buttons may include, but are not limited to: a home button, a volume button, a start button, and a lock button.

The sensor component 914 includes one or more sensors for providing the data transmission device 900 with various aspects of state assessment. For example, the sensor component 914 can detect the ON/OFF state of the data transmission device 900 and the relative positioning of components, such as the display and keypad of the data transmission device 900. The sensor component 914 can also detect the position change of the data transmission device 900 or a component of the data transmission device 900, presence or absence of contact between the user and the data transmission device 900, the orientation or acceleration/deceleration of the data transmission device 900, and the temperature change of the data transmission device 900. The sensor component 914 may include a proximity sensor configured to detect the presence of an object nearby when there is no physical contact. The sensor component 914 may also include an optical sensor, such as a CMOS or CCD image sensor, for use in imaging applications. In some embodiments, the sensor component 914 may also include an acceleration sensor, a gyroscope sensor, a magnetic sensor, a pressure sensor, or a temperature sensor.

The communication component 916 is configured to facilitate wired or wireless communication between the data transmission device 900 and other devices. The data transmission device 900 can access a wireless network based on a communication standard, such as WiFi, 2Q or 3Q or a combination thereof. In an exemplary embodiment, the communication component 916 receives a broadcast signal or a broadcast related message from an external broadcast management system via a broadcast channel. In an exemplary embodiment, the communication component 916 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the data transmission device 900 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic component, and is configured to implement the above-mentioned method for processing the SI request.

In an exemplary embodiment, there is also provided a non-transitory computer-readable storage medium including instructions, for example, the memory 904 including instructions, and the foregoing instructions may be executed by the processor 920 of the data transmission device 900 to implement the foregoing method. For example, the non-transitory computer-readable storage medium may be ROM, random access memory (RAM), CD-ROM, magnetic tape, floppy disk, optical data storage device, etc.

Figure 10:
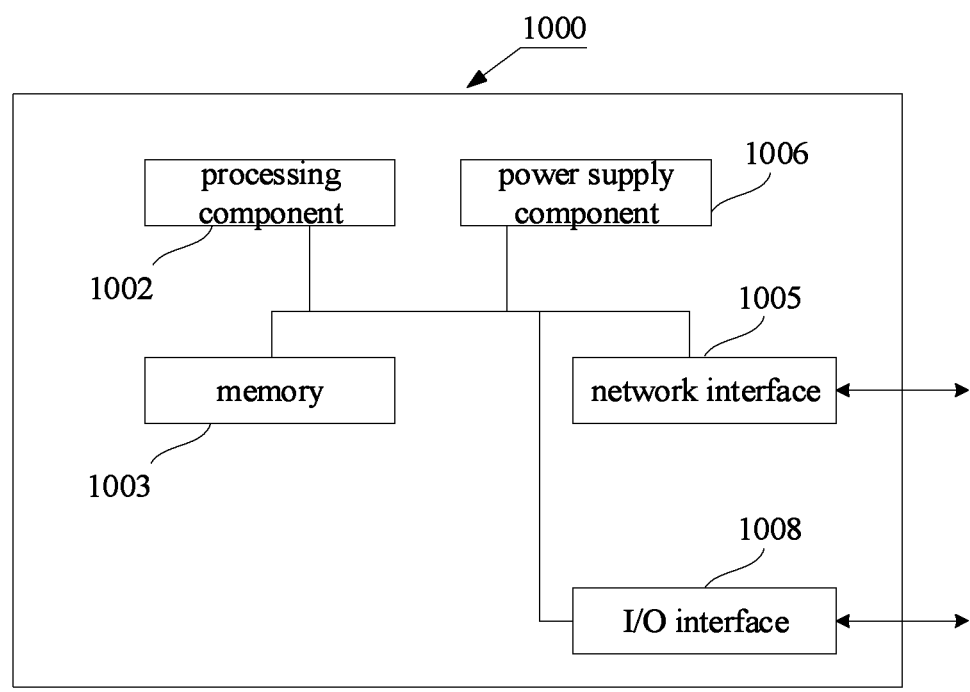
FIG. 10 is a block diagram of a data transmission device according to an exemplary embodiment.

FIG. 10 is a block diagram of a data transmission device according to an exemplary embodiment. For example, the data transmission device 1000 may be provided as a server. The data transmission device 1000 includes a processing component 1002, which further includes one or more processor, and memory resource represented by a memory 1003 for storing instructions that can be executed by the processing component 1002, such as application programs. The application programs stored in the memory 1003 may contain one or more modules each corresponding to a set of instructions. In addition, the processing component 1002 is configured to execute instructions to perform the above methods.

The data transmission device 1000 may further include a power supply component 1006 configured to perform power management of the data transmission device 1000, a wired or wireless network interface 1005 configured to connect the data transmission device 1000 to the network, and an input/output (I/O) interface 1008. The data transmission device 1000 can operate based on an operating system stored in the memory 1003, such as Windows Server™, Mac OS X™, Unix™, Linux™, FreeBSD™ or the like.

A non-temporary computer-readable storage medium is provided. For example, the non-temporary computer-readable storage medium may be ROM, random access memory (RAM), CD-ROM, magnetic tape, floppy disk, optical data storage device, etc. When instructions in the storage medium are executed by a processor of the data transmission device 900 or the data transmission device 1000, the data transmission device 900 or the data transmission device 1000 is enabled to perform the following methods, including:

obtaining physical configuration information of the terminal, the physical configuration information including a size and/or a read-write speed of a memory;

sending the physical configuration information of the terminal to a network access device when the terminal performs an initial connection with the network access device, the physical configuration information being configured to enable the network access device to determine target radio resource configuration parameters matching the physical configuration information.

In an embodiment, sending the physical configuration information of the terminal to the network access device when performing the initial connection with the network access device includes:

sending the physical configuration information of the terminal to the network access device when the terminal performs random access procedure.

In an embodiment, sending the physical configuration information of the terminal to the network access device when performing the initial connection with the network access device includes:

sending terminal capability information to the network access device when the terminal receives a terminal capability enquiry message sent by the network access device, the terminal capability information comprising the physical configuration information of the terminal Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

The technical solution provided embodiments of the present disclosure may include following beneficial effects. In this technical solution, by obtaining the physical configuration information of the terminal, and configuring matched target radio resource configuration parameters for the terminal according to the physical configuration information of the terminal, it is possible to avoid a buffer overflow problem of the terminal due to mismatching between the physical configuration information of the terminal and the configured high rate, reducing a number of data retransmissions, saving system resource, and improving business quality.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A data transmission method, applied to a network access device, comprising:
   receiving physical configuration information of a terminal sent by the terminal, the physical configuration information comprising a size and/or a read-write speed of a memory;
   determining target radio resource configuration parameters matching the physical configuration information; and
   transmitting data to the terminal using the target radio resource configuration parameters.

2. The method of claim 1, wherein receiving physical configuration information of the terminal sent by the terminal comprises:
   receiving the physical configuration information of the terminal sent by the terminal when performing random access procedure.

3. The method of claim 1, wherein receiving physical configuration information of the terminal sent by the terminal comprises:
   receiving terminal capability information sent by the terminal after the network access device sending a terminal capability enquiry message to the terminal, the terminal capability information comprising the physical configuration information of the terminal.

4. The method of claim 1, wherein determining the target radio resource configuration parameters matching the physical configuration information comprises:
   determining a maximum data transmission rate of the terminal according to the physical configuration information;
   determining a target data transmission rate of the terminal according to the maximum data transmission rate and a contracted rate of the terminal; and
   determining the target radio resource configuration parameters of the terminal according to the target data transmission rate of the terminal.

5. A data transmission method, applied to a terminal, comprising:
   obtaining physical configuration information of the terminal, the physical configuration information comprising a size and/or a read-write speed of a memory; and
   sending the physical configuration information of the terminal to a network access device when the terminal performs an initial connection with the network access device, the physical configuration information being configured to enable the network access device to determine target radio resource configuration parameters matching the physical configuration information.

6. The method of claim 5, wherein sending the physical configuration information of the terminal to the network access device when performing the initial connection with the network access device comprises:
sending the physical configuration information of the terminal to the network access device when the terminal performs random access procedure.

7. The method of claim 5, wherein sending the physical configuration information of the terminal to the network access device when performing the initial connection with the network access device comprises:
sending terminal capability information to the network access device when the terminal receives a terminal capability enquiry message sent by the network access device, the terminal capability information comprising the physical configuration information of the terminal.

8. A data transmission device, implementing the method of claim 1, comprising:
a processor; and
a memory configured to store instructions executable by the processor,
wherein, the processor is configured to perform steps of the method of claim 1.

9. A data transmission device, comprising:
a processor; and
a memory configured to store instructions executable by the processor,
wherein, the processor is configured to:
obtain physical configuration information of the terminal, the physical configuration information comprising a size and/or a read-write speed of a memory; and
send the physical configuration information of the terminal to a network access device when the terminal performs an initial connection with the network access device, the physical configuration information being configured to enable the network access device to determine target radio resource configuration parameters matching the physical configuration information.

10. The data transmission device of claim 9, wherein the processor is configured to send the physical configuration information of the terminal to the network access device when the terminal performs random access procedure.

11. The data transmission device of claim 9, wherein the processor is configured to send terminal capability information to the network access device when the terminal receives a terminal capability enquiry message sent by the network access device, the terminal capability information comprising the physical configuration information of the terminal.

* * * * *